(12) United States Patent
Balasubramanian et al.

(10) Patent No.: US 10,936,390 B2
(45) Date of Patent: Mar. 2, 2021

(54) AIRCRAFT CARGO MONITORING AND MAINTENANCE

(71) Applicant: Goodrich Corporation, Charlotte, NC (US)

(72) Inventors: Rameshkumar Balasubramanian, Karnataka (IN); Sudhendra Nayak, Bangalore (IN); Venkatesan Muthulingam, Karnataka (IN); Naveen Kumar Mallipattana Hiriyannaiah, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 175 days.

(21) Appl. No.: 15/956,822

(22) Filed: Apr. 19, 2018

(65) Prior Publication Data

US 2019/0256227 A1   Aug. 22, 2019

(30) Foreign Application Priority Data

Feb. 22, 2018   (IN) .............................. 201811006787

(51) Int. Cl.

| | |
|---|---|
| *G06F 11/00* | (2006.01) |
| *G06F 11/07* | (2006.01) |
| *B64F 5/60* | (2017.01) |
| *H04W 4/35* | (2018.01) |
| *B64D 9/00* | (2006.01) |
| *B64D 43/00* | (2006.01) |
| *B64C 1/20* | (2006.01) |
| *B64F 1/32* | (2006.01) |

(52) U.S. Cl.
CPC ............ *G06F 11/0739* (2013.01); *B64D 9/00* (2013.01); *B64D 9/003* (2013.01); *B64F 5/60* (2017.01); *G06F 11/006* (2013.01); *G06F 11/0793* (2013.01); *H04W 4/35* (2018.02); *B64C 1/20* (2013.01); *B64D 43/00* (2013.01);
(Continued)

(58) Field of Classification Search
CPC .... G06F 11/006; G06F 11/07; G06F 11/0709; G06F 11/0739; G06F 11/0736; G06F 11/0793; G06F 11/3013; G06F 2201/805; B64F 5/60; B64F 1/32; H04W 4/35;
(Continued)

(56) References Cited

U.S. PATENT DOCUMENTS

| 7,198,227 B2 | 4/2007 | Olin et al. |
|---|---|---|
| 8,220,750 B2 | 7/2012 | Hettwer |

(Continued)

OTHER PUBLICATIONS

European Search Report for Application No. 19157943.2-1010, dated Jun. 4, 2019, 8 pages.

*Primary Examiner* — Joseph D Manoskey
(74) *Attorney, Agent, or Firm* — Cantor Colburn LLP

(57) ABSTRACT

A system for monitoring and maintaining aircraft cargos includes a plurality of master control panels each operatively connected with at least one Line Replaceable Unit (LRU) operating in a cargo compartment of an aircraft, and at least one unit load device (ULD). The at least one ULD and at least one LRU are configured to move a cargo unit in the cargo compartment based on a control signal from the master control panel. The system also includes a command unit operatively connected with each control panel of the plurality of master control panels. The command unit includes a processor configured to retrieve a status of the cargo from each of the plurality of master control panels, and display, on an output device, a status of the at least one ULD of a plurality of ULDs and a status of the at least one LRU via the processor.

19 Claims, 12 Drawing Sheets

(52) U.S. Cl.
CPC .......... *B64D 2009/006* (2013.01); *B64F 1/32* (2013.01); *G06F 2201/805* (2013.01)

(58) Field of Classification Search
CPC .......... B64D 9/00; B64D 9/003; B64D 43/00; B64D 2009/006; B64C 1/20
See application file for complete search history.

(56) References Cited

U.S. PATENT DOCUMENTS

| | | |
|---|---|---|
| 8,515,656 B2 | 8/2013 | Reed et al. |
| 8,768,608 B2 | 7/2014 | Scherenberger et al. |
| 9,162,765 B2 | 10/2015 | Huber |
| 2003/0179079 A1 | 9/2003 | Huber et al. |
| 2006/0126608 A1* | 6/2006 | Pereira ................ H04L 41/0866 370/360 |
| 2009/0105874 A1 | 4/2009 | Tietjen et al. |
| 2010/0100225 A1 | 4/2010 | Reed et al. |
| 2010/0213313 A1 | 8/2010 | Reed et al. |
| 2011/0313564 A1 | 12/2011 | Schnörwangen et al. |
| 2012/0197480 A1* | 8/2012 | Beninca ................ B64F 5/60 701/29.9 |
| 2013/0158700 A1 | 6/2013 | Scherenberger et al. |
| 2016/0117536 A1 | 4/2016 | Johnsen |
| 2016/0342496 A1* | 11/2016 | Cahill ................ G06F 11/3013 |
| 2017/0097915 A1* | 4/2017 | Pronto ................ G06F 13/4068 |

* cited by examiner

AIRCRAFT CARGO MONITORING AND MAINTENANCE

FOREIGN PRIORITY

This application claims priority to Indian Patent Application No. 201811006787 filed Feb. 22, 2018, the entire contents of which is incorporated herein by reference.

BACKGROUND

Exemplary embodiments pertain to the art of aircraft cargo management, and more particularly to an aircraft cargo monitoring and maintenance system.

Items to be shipped via aircraft cargo are first loaded onto a Unit Load Device (ULD). ULDs are specially configured pallets or specially configured containers. ULDs are available in various sizes, shapes and capacities. Once a ULD is loaded with cargo items, the ULD is loaded onto the aircraft through the cargo hold doorway. The ULDs are moved in the cargo compartment by Power Drive Units (PDUs) mounted at floor level at fixed intervals down the length of the compartment. Once the ULD has been stowed in its final position it is restrained by means of mechanical or electro-mechanical restraint system. Freighter Common Turntables (FCTs) are installed in & forward of the doorway and can steer the ULDs to various positions as needed for IN/OUT, FWD/AFT, or pallet rotation modes. Multiple ULDs are brought onboard the aircraft and each is placed in its respective stowed position. PDUs and FCTs are referred to collectively as Line Replaceable Units.

A Master Control Panel, an Outside Control Panel and/or Local Control Panels are used in any combination or independently to control movement of ULDs. The cargo systems provide a dedicated display to enable the operator to monitor the status of ULD position and the status of the cargo line replaceable units. The master control panel provides the control system operation status and cargo system status to the display. The display additionally enables the operator to perform various maintenance operations on the cargo systems.

Conventional cargo system implements Cargo Maintenance Display Units (CMDUs) to display the cargo system status during normal operation (cargo loading mode). The CMDUs are fixed on the aircraft interior wall of each cargo compartments. FIGS. 1 and 2 depict various modes of an exemplary CMDU in a conventional cargo maintenance system. FIG. 1 shows the cargo loading mode of a CMDU, which is used primarily in the cargo loading process. The cargo loading mode screen in a CMDU displays the graphical representation of the cargo compartment and displays the status information (like drive status, orientation and retraction status) of the cargo line replaceable unit. The CMDU receives the control system operation status and cargo system status from the master control panel.

The CMDU is also the maintenance interface for selecting maintenance operations to be run by the master control panel. The operator uses the CMDU menus and screens to display the requested Built-In Test Equipment fault log information and/or to initiate an interactive test. FIG. 2 shows a user interface screen displaying a maintenance mode screen of an existing CMDU, which is used in the cargo maintenance process. The cargo maintenance mode is accessed through the cargo loading mode and is generally password secured. The maintenance mode provides diagnostic information about the line replaceable units and allows the operator to execute diagnostic tests. The CMDU displays the cargo system status & control system operation status of the cargo compartment in which the CMDU is installed. In conventional cargo management systems, as depicted in FIG. 1, the CMDU has a limited viewable display area, and the amount of details that are displayed in single page/screen is very high due to large amount of line replaceable units in each cargo compartment. The visual pages for the cargo loading mode and the maintenance mode are displayed separately in the CMDU of conventional systems, such as the CMDU displays depicted in FIGS. 1 and 2. This can make it difficult for the operator to correlate the details of the faulty line replaceable units (PDUs and/or FCTs) and make it difficult to perform diagnostic tests on the faulty line replaceable units.

Another weakness of conventional systems is that the process of identifying the fault/error information in the CMDU is not intuitive; The operator has to identify the line replaceable unit number from the cargo loading page, run diagnostic test in the maintenance test page and check the fault/error log information in the fault log page. This process can be time consuming, and may confuse the operator. The actual movement of the ULDs are not displayed in CMDU, instead the movement of the ULDs have to be monitored through the line replaceable unit status. This makes it difficult to understand the display and demands well trained personnel to monitor the cargo loading operations.

It is advantageous, therefore, to provide an intuitive system that answers these long-felt needs in the art of aircraft cargo monitoring and maintenance.

BRIEF DESCRIPTION

Disclosed is a system for monitoring and maintaining aircraft cargos. The system includes a plurality of master control panels each operatively connected with at least one Line Replaceable Unit (LRU) operating in a cargo compartment of an aircraft and at least one unit load device (ULD). The at least one ULD and at least one LRU are configured to move a cargo unit in the cargo compartment based on a control signal from the master control panel. The system also includes a command unit operatively connected with each master control panel of the plurality of master control panels. The command unit includes a processor configured to retrieve a status of the cargo from each of the plurality of master control panels, and display, on an output device, a status of the at least one ULD of a plurality of ULDs and a status of the at least one LRU via the processor.

Also disclosed is a method for monitoring and maintaining aircraft cargos. The method includes connecting a plurality of master control panels with at least one Line Replaceable Unit (LRU) operating in a cargo compartment of an aircraft and at least one unit load device (ULD). The at least one ULD and at least one LRU are configured to move a cargo unit in the cargo compartment based on a control signal from the master control panel. The method further includes connecting a command unit operatively with each master control panel of the plurality of master control panels, where the command unit includes a processor configured for retrieving a status of the cargo from each of the plurality of master control panels and displaying, on an output device, a status of the at least one ULDs and a status of the at least one LRUs via the processor.

Also disclosed is a computer program product that includes a non-transitory computer readable medium. The computer readable medium includes program instructions stored thereupon that, when executed by a processor, perform a method for monitoring and maintaining aircraft cargos. The method includes connecting a plurality of master control panels with at least one Line Replaceable Unit (LRU) operating in a cargo compartment of an aircraft and at least one unit load device (ULD). The at least one ULD and at least one LRU are configured to move a cargo unit in the cargo compartment based on a control signal from the master control panel. The method further includes connecting a command unit operatively with each master control panel of the plurality of master control panels, where the command unit includes a processor configured for retrieving a status of the cargo from each of the plurality of master control panels and displaying, on an output device, a status of the at least one ULDs and a status of the at least one LRUs via the processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
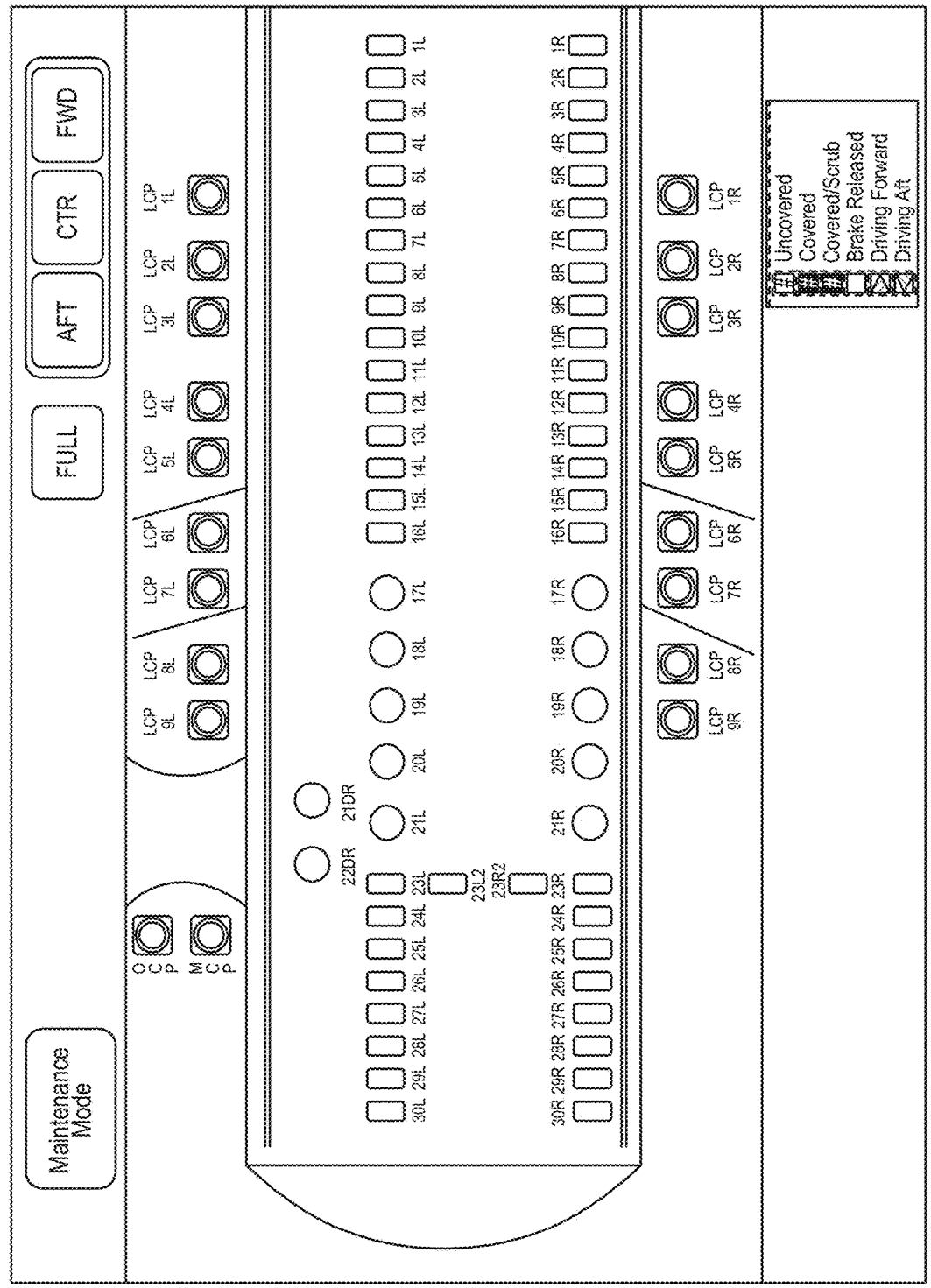
FIG. 1 is a view of a cargo loading mode of a cargo maintenance display unit in a conventional cargo management system.
Figure 2:
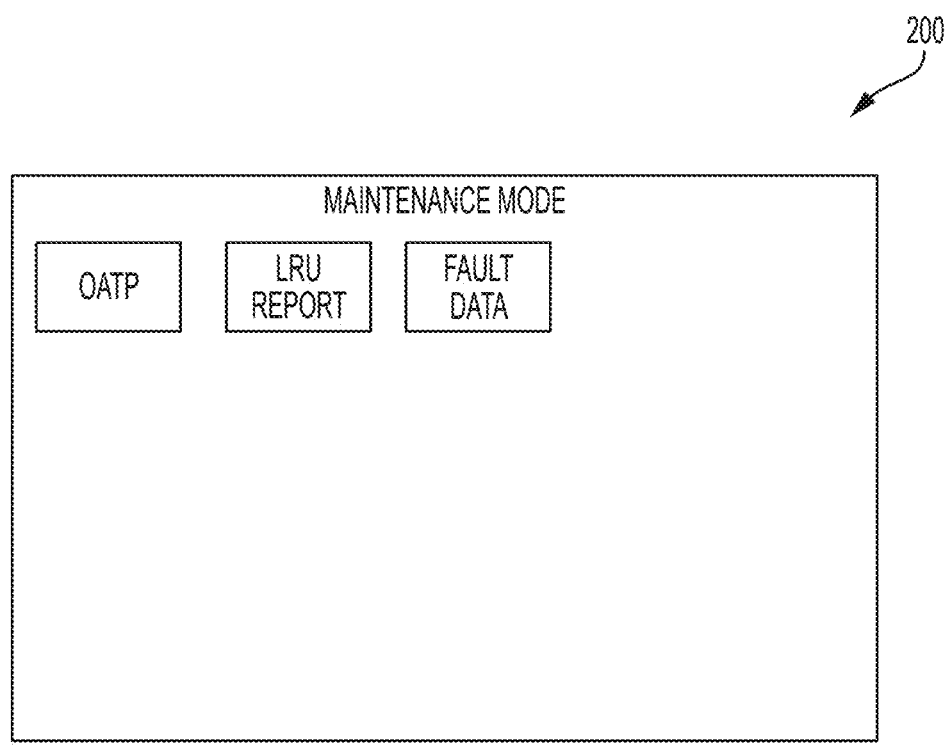
FIG. 2 is a view of a maintenance mode display of a conventional cargo maintenance display unit.
Figure 3:
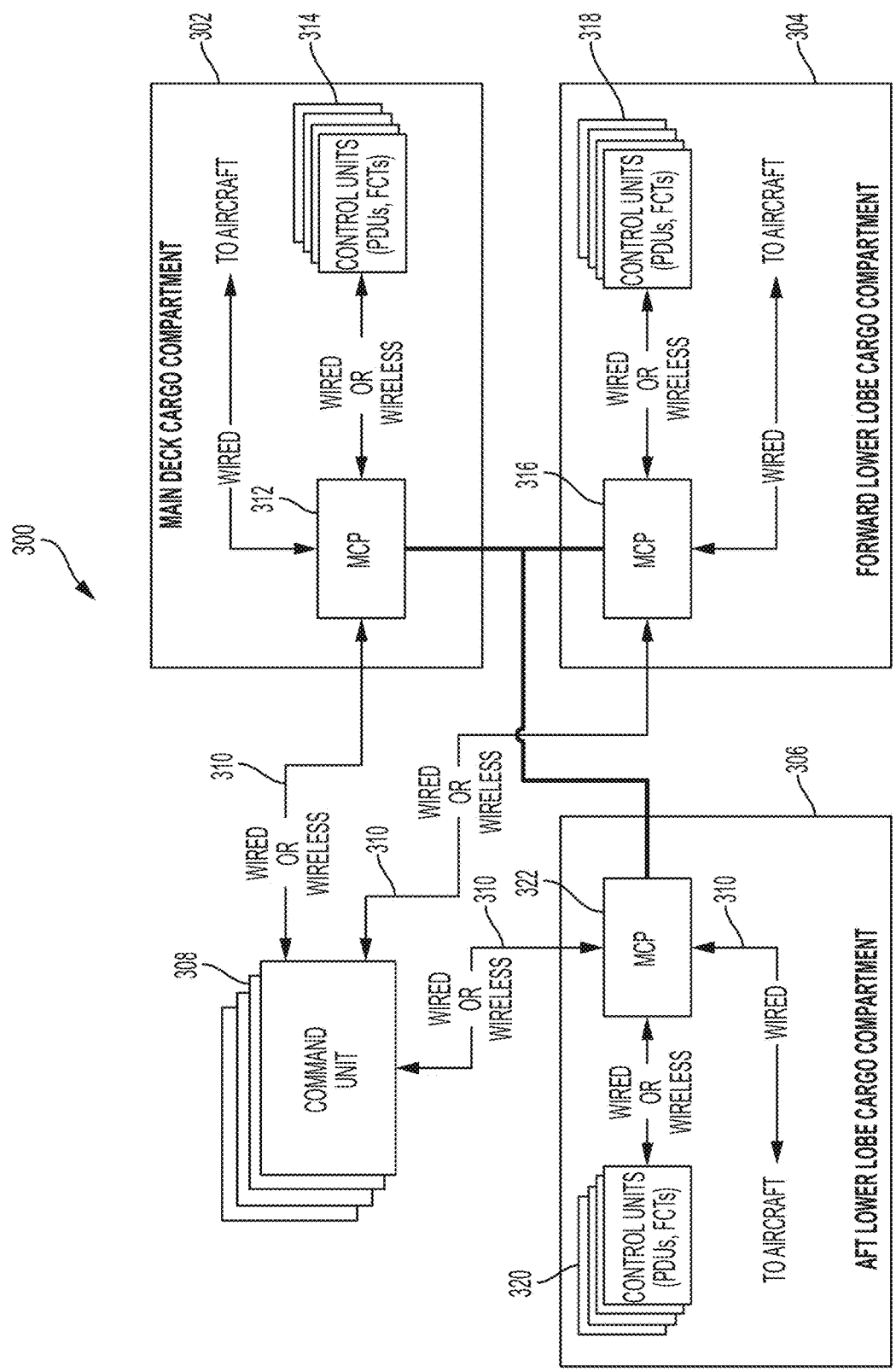
FIG. 3 is system diagram of a cargo maintenance display system according to an embodiment.

FIG. 3 is a system diagram of a cargo maintenance display system 300 (hereafter "system 300") according to an embodiment. FIG. 3 illustrates the high-level architecture of the system 300, which is a cargo handling system that interfaces a Cargo Monitoring and Maintenance Display (CMMD) unit 308 (hereafter "command unit 308") with multiple cargo moving equipment of an existing cargo handling system. The system 300 includes the command unit 308 connected (either with hard wire or wirelessly) with a plurality of control units via a network of communication channels 310.

During a cargo loading operation, multiple ULDs are brought onboard the aircraft and each is placed in its respective stowed position. The ULDs are moved in the cargo compartment by Power Drive Units (PDUs) mounted at floor level of the aircraft cargo hold at fixed intervals down the length of the compartment. Freighter Common Turntables (FCTs) are installed in & forward of the doorway and can steer the ULDs to various positions as needed for IN/OUT, FWD/AFT, or pallet rotation modes. As previously described with respect to conventional systems, PDUs and FCTs are referred to collectively as Line Replaceable Units, or LRUs. Each master control panel installed in a respective cargo compartment is connected with the LRUs installed and/or operating in that particular compartment. For example, the master control panel 322 operates in cargo compartment 306, master control panel 316 operates in cargo compartment 304, and master control panel 312 operates in compartment 302.

A Master Control Panel (MCP) controls movement of ULDs (upon which the cargos are sitting). The cargo system 300 provides a dedicated display to enable the operator to monitor the status of ULD position and the status of the cargo line replaceable units. The master control panels 312, 316, 322 provide the control system operation status and cargo system status to the display. The display additionally enables the operator to perform various maintenance operations on the cargo systems.

Figure 11:
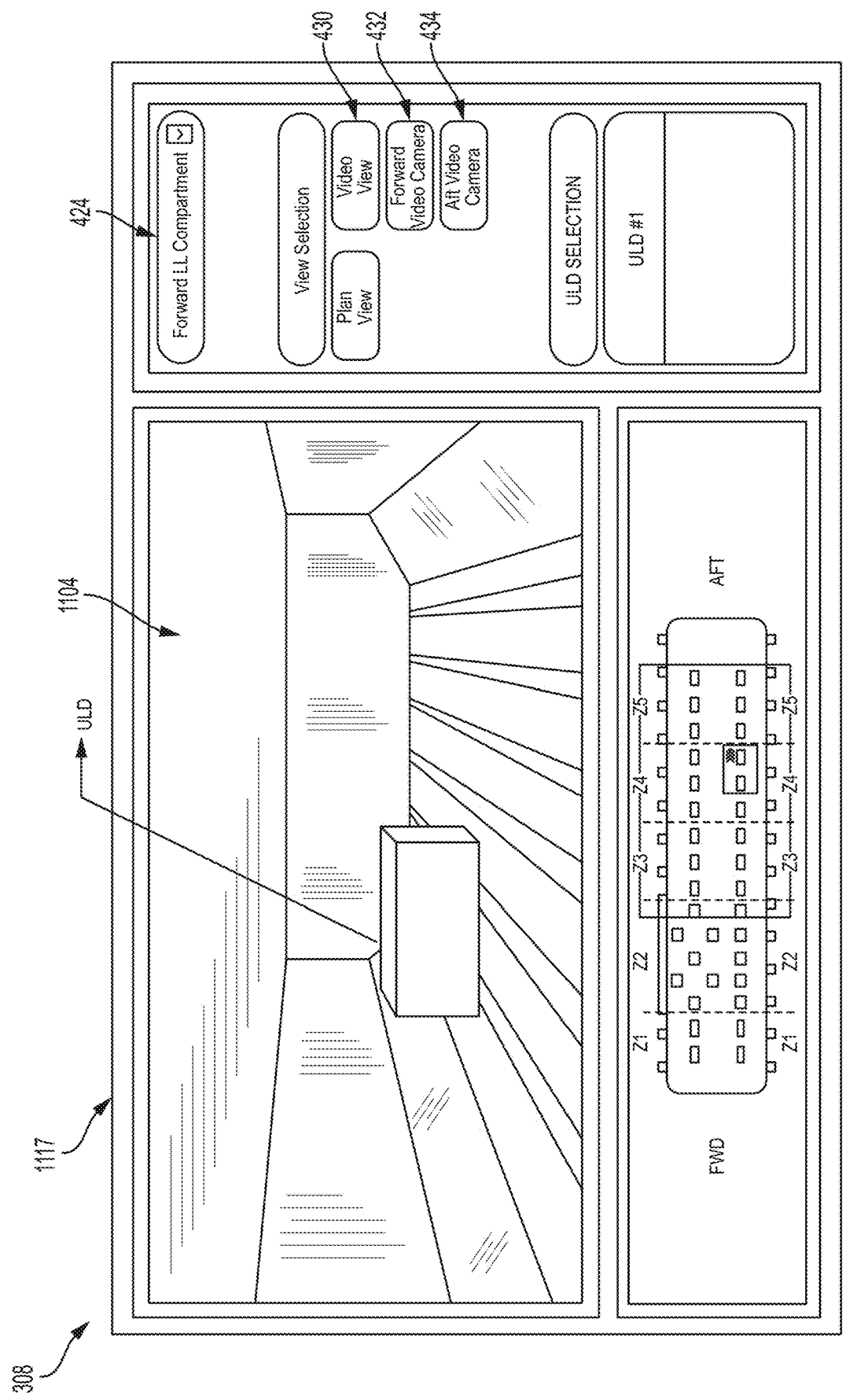
FIG. 11 depicts an AFT view video feed from the Forward LL cargo compartment according to an embodiment.

According to embodiments described herein, the command unit 308 includes a display (e.g., a display 1117 as shown with respect to FIG. 11). The display 1117 is configured to show a status of the ULDs and a status of cargo Line Replaceable Units (LRUs) during a cargo loading operation. As explained hereafter, the status of the ULDs and the LRUs can include information such as equipment and cargo position, movement, faults and/or errors encountered during the movement of the cargos, and other information. The cargos, which are loaded on the ULDs, are moved by the system 300 into various separate compartments of the aircraft cargo hold.

An aircraft can include separate compartments for stowing cargos. For example, as shown in FIG. 3, an aircraft cargo hold includes a main deck cargo compartment 302, a forward lower lobe cargo compartment 304, and an aft lower lobe cargo compartment 306. Each of the cargo compartments 302, 304, and 306, include a separate master control panel. For example, the main deck cargo compartment 302 includes a master control panel 312, which is operatively connected (either wired or wirelessly) with a plurality of control units 314 (e.g., the PDUs, FCTs, etc.) for moving the cargos.

Figure 4:
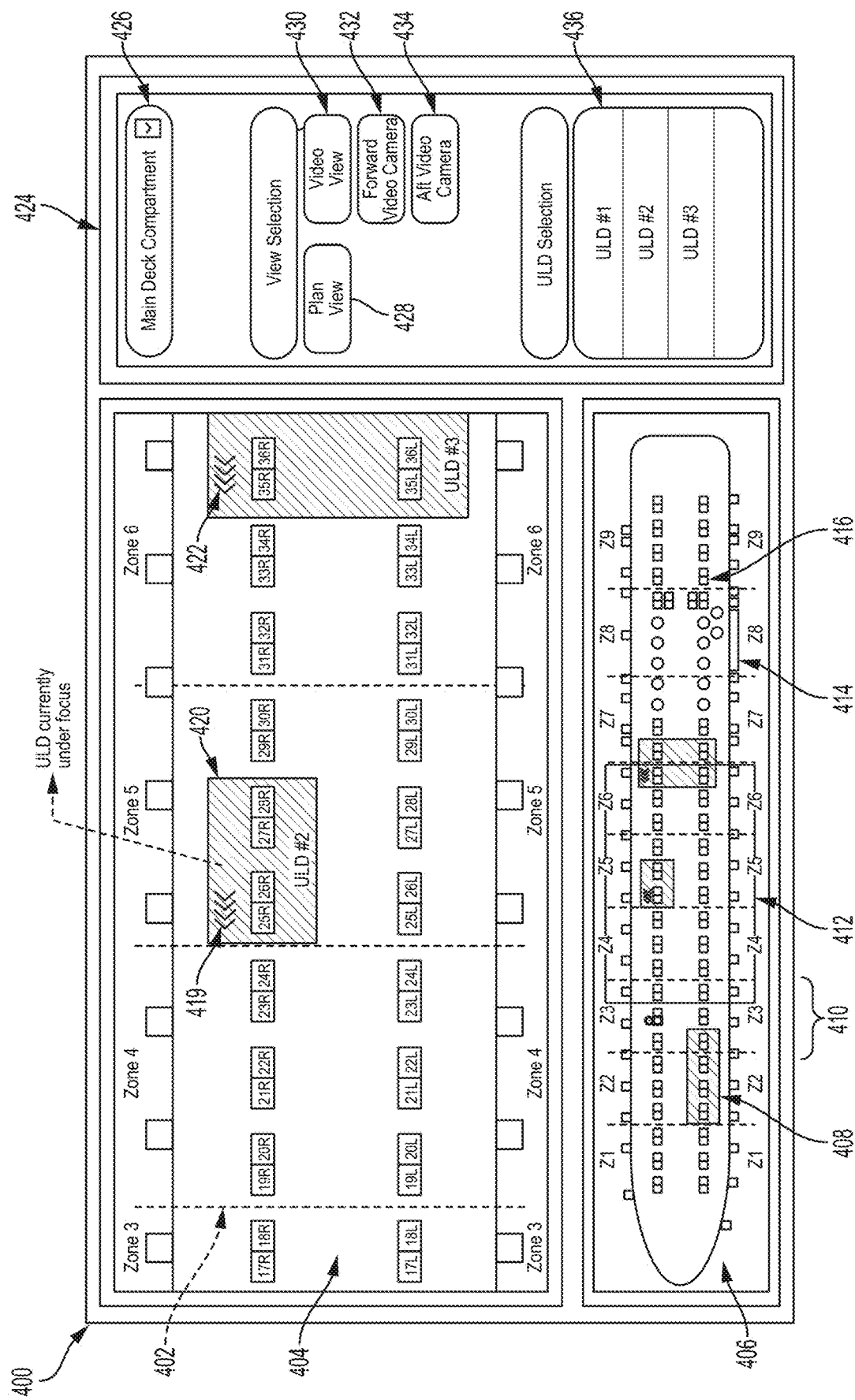
FIG. 4 depicts a graphical user interface of the cargo maintenance display system of FIG. 3 according to an embodiment.

In other aspects, the command unit 308 is configured to display a live video feed from any cargo compartment of interest on the aircraft for visual tracking of the ULDs on the display 1117 via a graphic user interface. FIG. 4 depicts a graphical user interface 400, showing a representation of a main deck cargo compartment of an aircraft.

The graphical user interface 400 of the CMMD unit displays representations having two different aspect scales for a user to understand a status of individual and collective cargos as they are loaded onto and stowed in their respective compartments. The graphical user interface includes a compartment view 406, and a detailed view 404. The graphic user interface 400 further includes a selection panel 424.

The compartment view 406 shows graphical representations of the cargo compartment with all the LRUs 416 in the cargo compartment 406. Other features of interest are depicted such as, for example, a cargo doorway 414.

The user interface 400 depicts a sliding marker window 412 (a box like representation) indicative of a region of interest shown in the above detailed view 404.

As depicted in FIG. 4, user interface 400 can output a current position of the ULDs 408, movement of the ULDs 408, and the status of all cargo LRUs 416 in the cargo compartment. The zones of the cargo compartment are depicted as zones 410. These features are described in greater detail below with respect to the detailed view 404. User input of a box limit selection enables the user to slide the marker window 412 from FWD to AFT of the cargo compartment view 406. By sliding the marker window 412, the detailed view 404 of the cargo compartment view 406 updates with the same representation as shown in the compartment view 406, but in a zoomed view that shows greater detail. For example, according to an embodiment, the detailed view 404 shows the zoomed-in/detailed view of the cargo compartment region under focus of the marker window 412. In one aspect, the detailed view 404 shows the details of the LRUs 416, status of the LRUs 416, movement of ULDs 408, and fault/error status of the LRUs 416 in detail. The detailed view 404 also enables an operator to select the faulty LRUs 416 for more detailed diagnostic information. Details of the compartment can include details such as, for example, a dividing marker 402 that marks the division between compartment zones.

The user interface 400 can be a user touch enabled (e.g., a touch screen) user environment. The touch enabled display environment enables an operator to slide the detailed view 404 from a FWD position view (to the left of the cargo compartment) to an AFT position view (to the right of the cargo compartment).

The selection panel 424 shows a selection option 426 to select the different cargo compartments in the aircraft, and a selection options 428 to switch between a plan view as shown in FIG. 4 and a selection option for a video view 430 (depicted hereafter in FIG. 11). The selection panel 424 also provides an option 436 to receive a user selection for different ULDs 408 upon which to focus.

Figure 5:
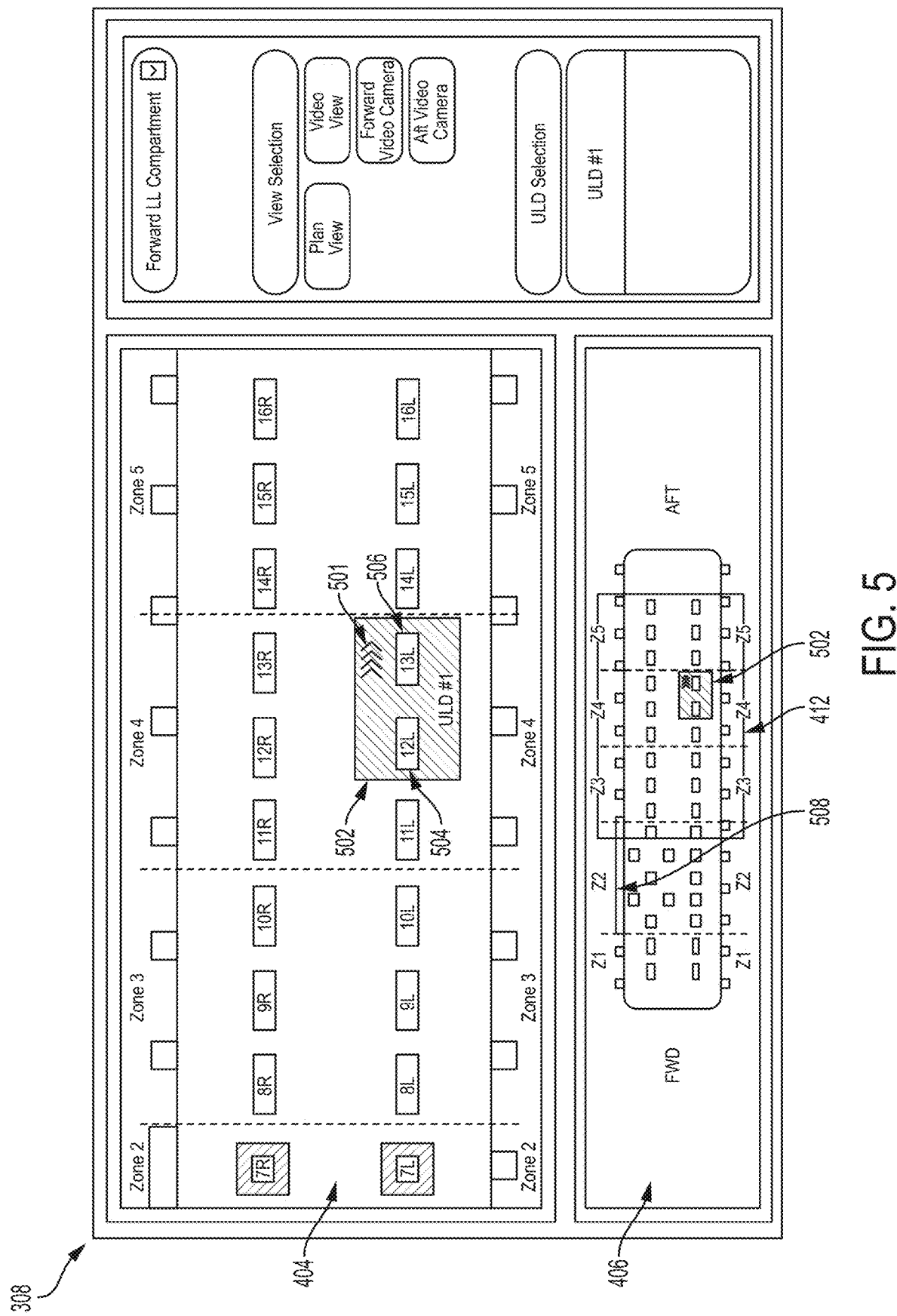
FIG. 5 depicts a display screen representation of the command unit of the cargo maintenance display system of FIG. 3, the display screen representing a Forward Lower Lobe (Forward LL) compartment of an aircraft cargo hold according to an embodiment.
Figure 6:
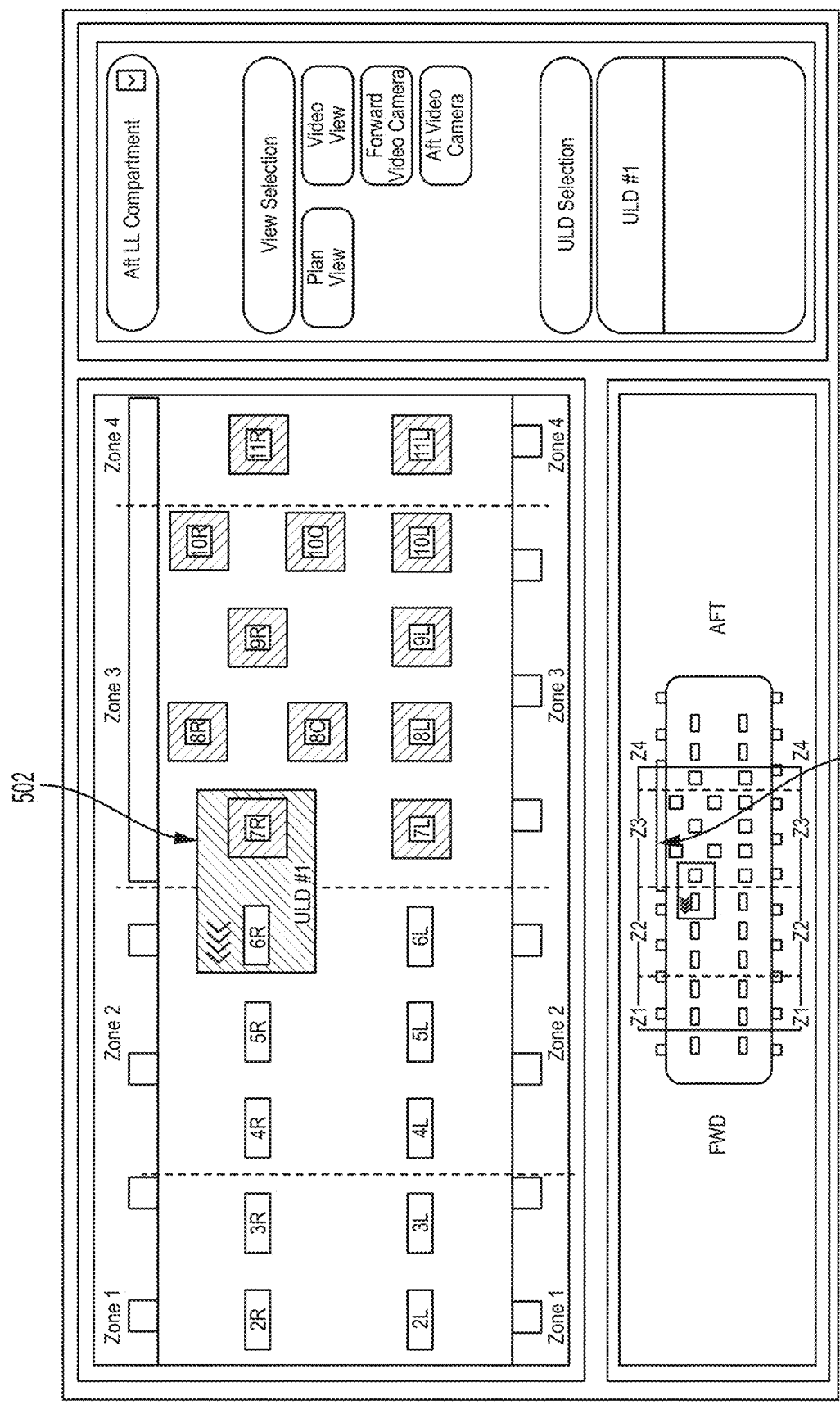
FIG. 6 shows another display screen of the command unit of the cargo maintenance display system of FIG. 3, depicting a representation of Aft Lower Lobe (Aft LL) cargo compartments of an aircraft cargo hold according to an embodiment.

FIG. 5 shows the command unit 308 displaying the Forward Lower Lobe (Forward LL) cargo compartment. FIG. 6 depicts a view screen of Aft Lower Lobe (Aft LL) cargo compartment. FIGS. 5 and 6 are discussed in conjunction with one another. As depicted in FIG. 5, a ULD 502 that is under focus is shown in the cargo compartment view 406, within the marker window 412. In the detailed view 404, the zoomed view of the ULD 502 is shown, with a direction of travel arrow 501 indicating the travel direction of the ULD 502. The display of the user interface 400 changes position in sync with the movement of the ULD 502.

Figure 7:
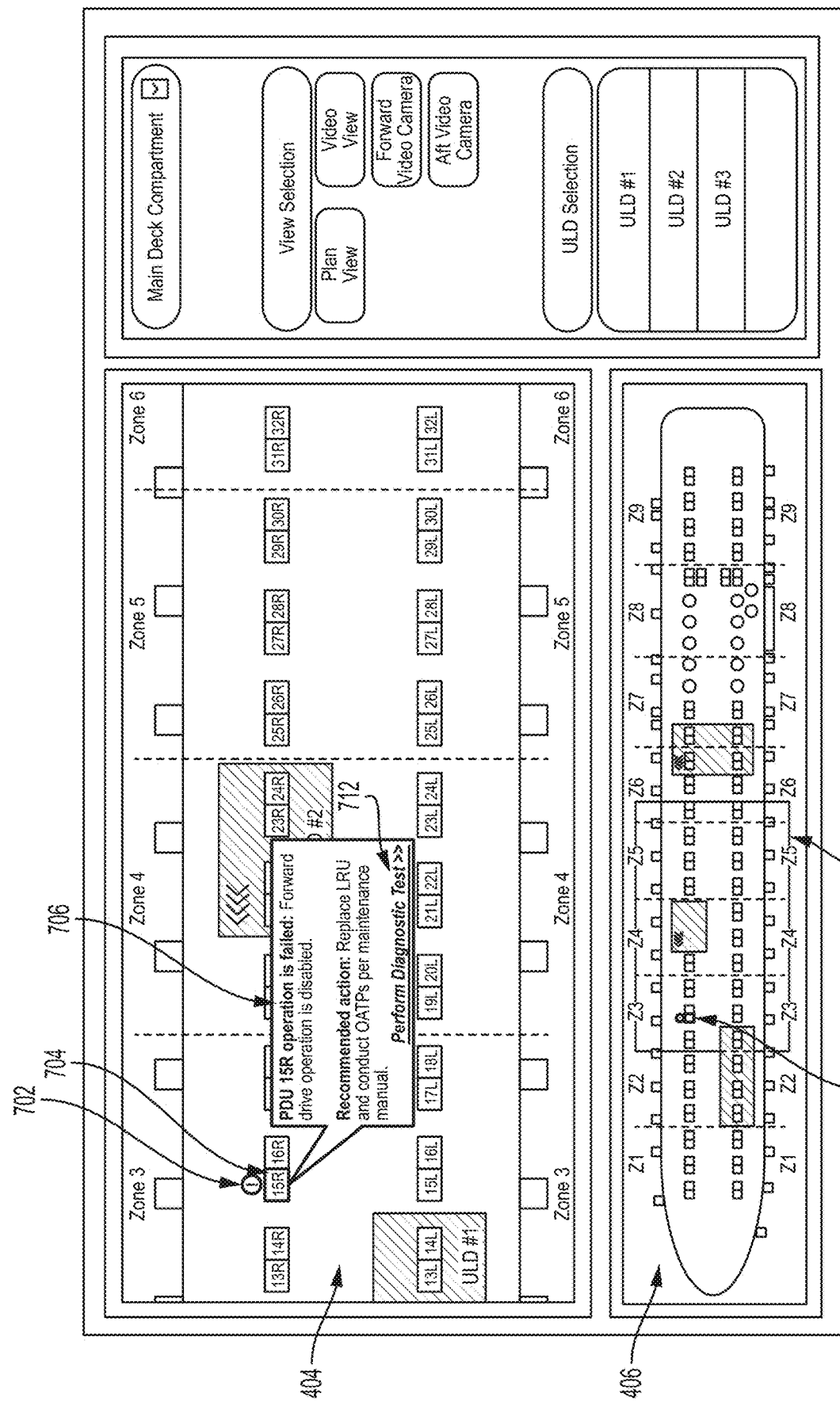
FIG. 7 depicts another display screen of the command unit of the cargo maintenance display system of FIG. 3, the display screen depicting a faulty LRU in both of a compartment view and a detailed view according to an embodiment.

FIG. 7 depicts the display of faulty LRU 704 in both compartment view 406 and detailed view 404. FIG. 7 also shows the display of fault/error indicator 702. In one aspect, the fault/error indicator 702 provides information regarding a faulty LRU 704. The detailed view 404 includes a popup interface 706 showing the detailed diagnostic information with recommended action(s). For example, the popup interface provides an option 712 for the operator to perform the diagnostic test on the faulty LRU 704.

Figure 8:
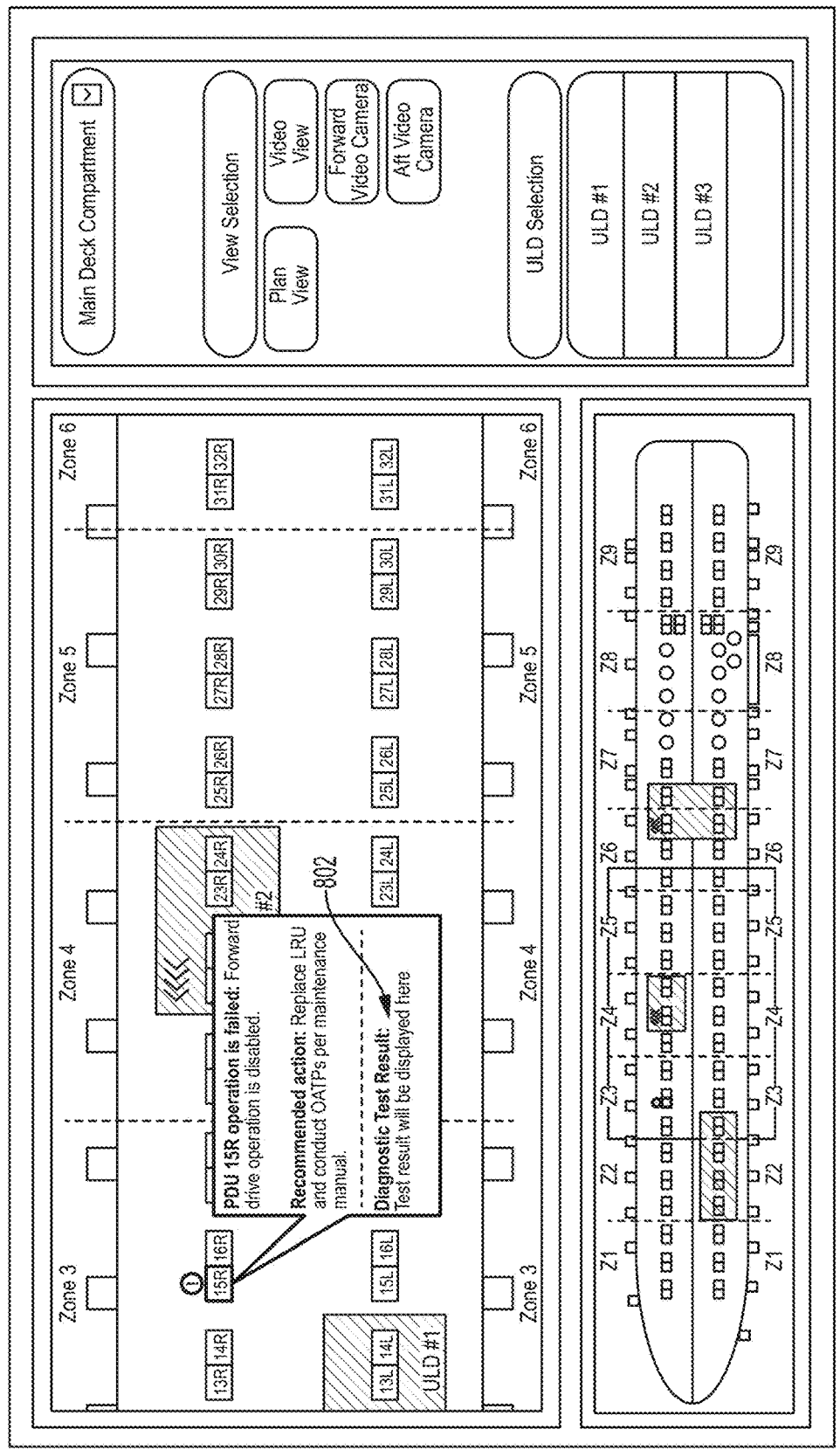
FIG. 8 depicts a user interface display of a diagnostic test result updated to the popup interface by the processor according to an embodiment.

FIG. 8 depicts a user interface display of a diagnostic test result 802 updated to the popup interface by the processor 1301.

Operation of the system is now described in greater detail. FIGS. 3-8 will be referenced together, in conjunction with following figures for ease of description. First, an operator selects the intended cargo compartment from the Selection Panel 424 (e.g., "Main Deck Compartment" 426, as shown in FIG. 4). Based on the user input, the processor 1301 communicates with the selected MCP of the selected cargo compartment via wired and/or wireless communication channel 310 (as shown in FIG. 3). The command unit 308 displays the graphical representation of the selected cargo compartment in both the compartment view 406 and the detailed view 404. The status of ULDs & the status of available LRUs in the selected cargo compartment are updated by the processor 1301 in the compartment & detailed views 406, 404. The faulty LRUs 704 are displayed with fault/error indicators 702 for easy identification of the problematic system component (shown in FIG. 7). The operator can monitor the ULDs currently being driven through the control panels, and select the faulty LRU 704 from the detailed view 404 to diagnose the fault/error. The command unit 308 then displays the popup interface 706 with basic fault information and the recommended actions to fix the faults. The operator may initiate the diagnostic test for the faulty LRU from the popup interface 706 by selecting the option 712. As shown in FIG. 8, the detailed diagnostic test result 802 is displayed to the operator.

The command unit 308 enables the operator to monitor the ULDs very closely. The operator selects the ULD 436 to track from the selection panel 424. The marker window 412 in the compartment view 406 focuses the selected ULD and the detailed view 404 shows & focuses the selected ULD. As the ULD is driven towards FWD or AFT from the control panel (the direction of which shown with direction arrows 419) the detailed view display 404 moves the background of the cargo compartment by maintaining the ULD 420 in the center of the display. The marker window 412 in the compartment view 406 moves in-line with the ULD 420 movement.

Figure 9:
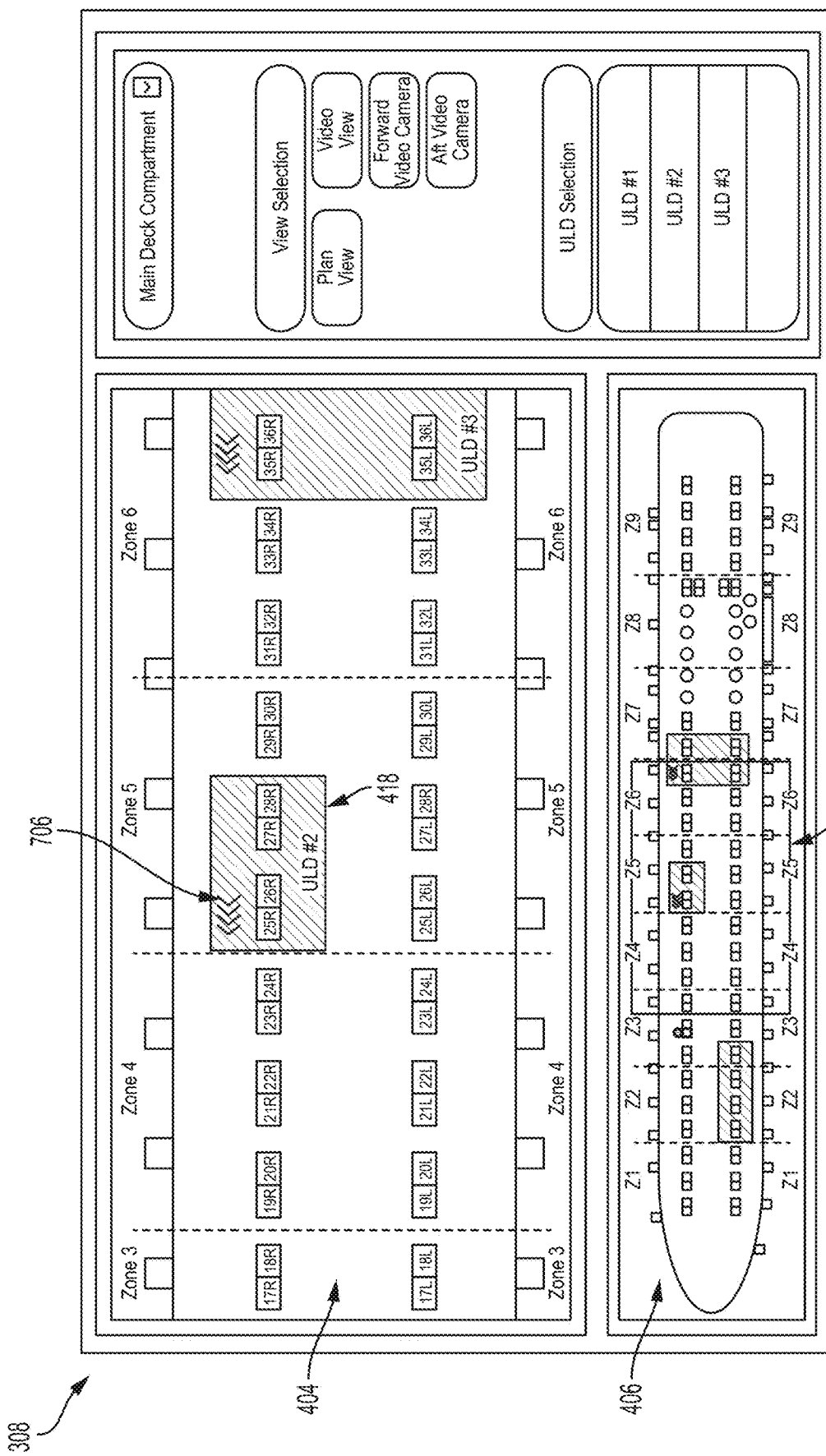
FIG. 9 illustrates the operation of monitoring and tracking of ULDs.
Figure 10:
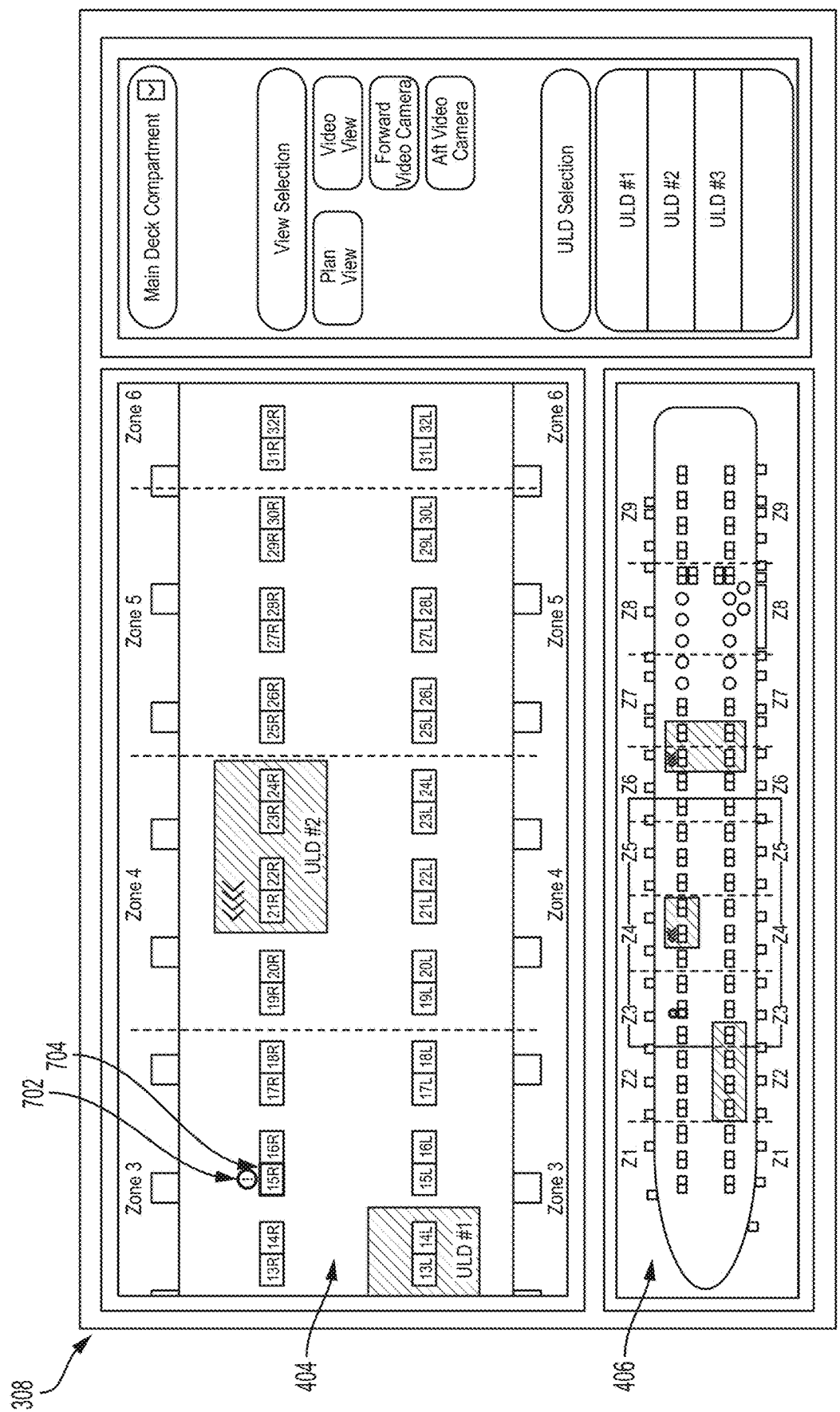
FIG. 10 illustrates another view of the operation of monitoring and tracking of ULDs.

FIG. 9 and FIG. 10 respectively illustrate the operation of monitoring and tracking of ULDs. FIG. 9 shows that the ULD #2 418 is currently in Zone #5 and is highlighted using a different color. The compartment view 406 shows that the marker window 412 is centered at ULD #2 418. The detailed view 404 shows the LRUs of the cargo compartment in detail with the display centered at ULD #2 418. The detail view shows that ULD #2 418 is currently over PDUs #25R, #26R, #27R and #28R. The display shows that the ULD #2 418 is driven in the FWD direction and is represented by the direction arrow 706 on the ULD #2 418.

FIG. 10 shows that the ULD #2 418 had moved from Zone #5 to Zone #4. The detailed view 404 shows that the ULD #2 418 is currently over PDUs #21R, #22R, #23R and #24R. In this case, the background of the display has moved to the right; with ULD #2 418 still in focus and centered in the display. Note that the fault/error indicator 702 provides an indication of an erroneous LRU 704.

The command unit 308 enables an operator to monitor the movement of ULDs via a live video feed/stream. FIG. 11 shows the AFT view video feed from the Forward LL cargo compartment of the aircraft cargo hold. Upon the selection of Video View 430 from the selection panel 424, the command unit 308 displays the live video feed 1104 from the selected cargo compartment (Forward LL Compartment, e.g.). The command unit 308 displays the video feed 1104 from either FWD or AFT looking camera in the cargo compartment.

Embodiments of the present invention benefit the art in a number of ways. For example, connectivity to multiple cargo compartments makes the use of the system intuitive and easy to use. The command unit 308 connects to the MCP in any of the three cargo compartments. This helps in weight reduction due to removal of multiple CMDUs from main deck, forward lower lobe and aft lower lobe cargo compartments.

The CMMD unit displays a fault/error indicator on the faulty LRUs enabling the operator to retrieve the fault information and perform diagnostic test on the selected faulty LRU. This helps in faster debugging & diagnostics of faults in the Cargo Handling System without switching between multiple display pages/screens.

In other aspects, the industry is benefitted by monitoring & tracking the cargo loading inside aircraft. The command unit 308 enables selective monitoring of ULD loading, and focuses on the selected ULD by centering it on the display screen and tracking the movement. The CMMD unit also provides the live video feed from the cargo compartment to visually track the ULD.

Figure 12:
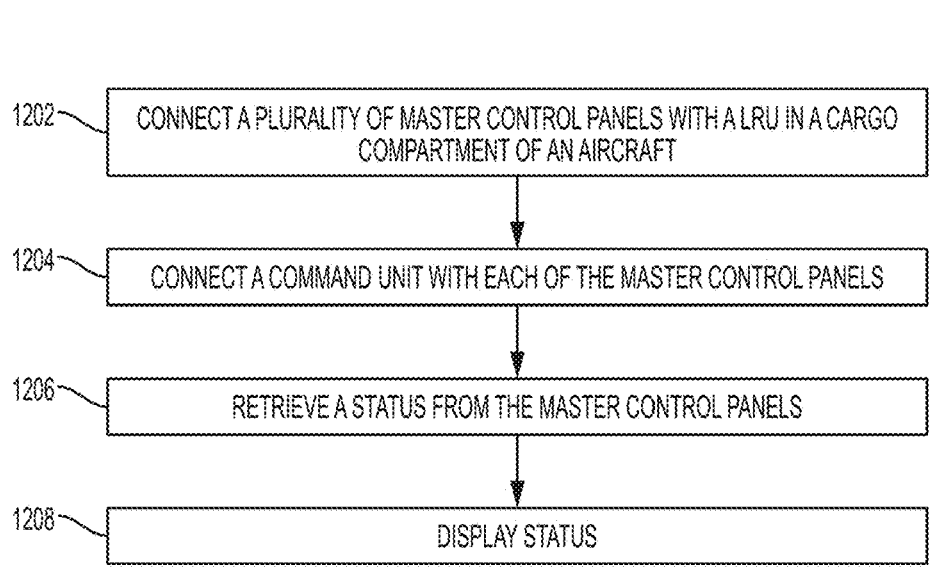
FIG. 12 is flow diagram of a method for monitoring and maintaining aircraft cargos.

FIG. 12 depicts a flow diagram 1200 of a method for monitoring and maintaining aircraft cargos. As shown in block 1202, the method 1200 includes connecting a plurality of master control panels with at least one Line Replaceable Unit (LRU) operating in a cargo compartment of an aircraft and at least one unit load device (ULD). The at least one ULD and the at least one LRU are configured to move a cargo unit in the cargo compartment based on a control signal from the master control panel.

As shown in block 1204, the method includes connecting a command unit operatively with each master control panel of the plurality of master control panels. As depicted in block 1206, the processor 1301 is configured for retrieving, via the processor 1301, a status of the cargo from each of the plurality of master control panels. At block 1208, the processor 1301 displays, on an output device, a status of the at least one ULDs and a status of the at least one LRUs via the processor.

Figure 13:
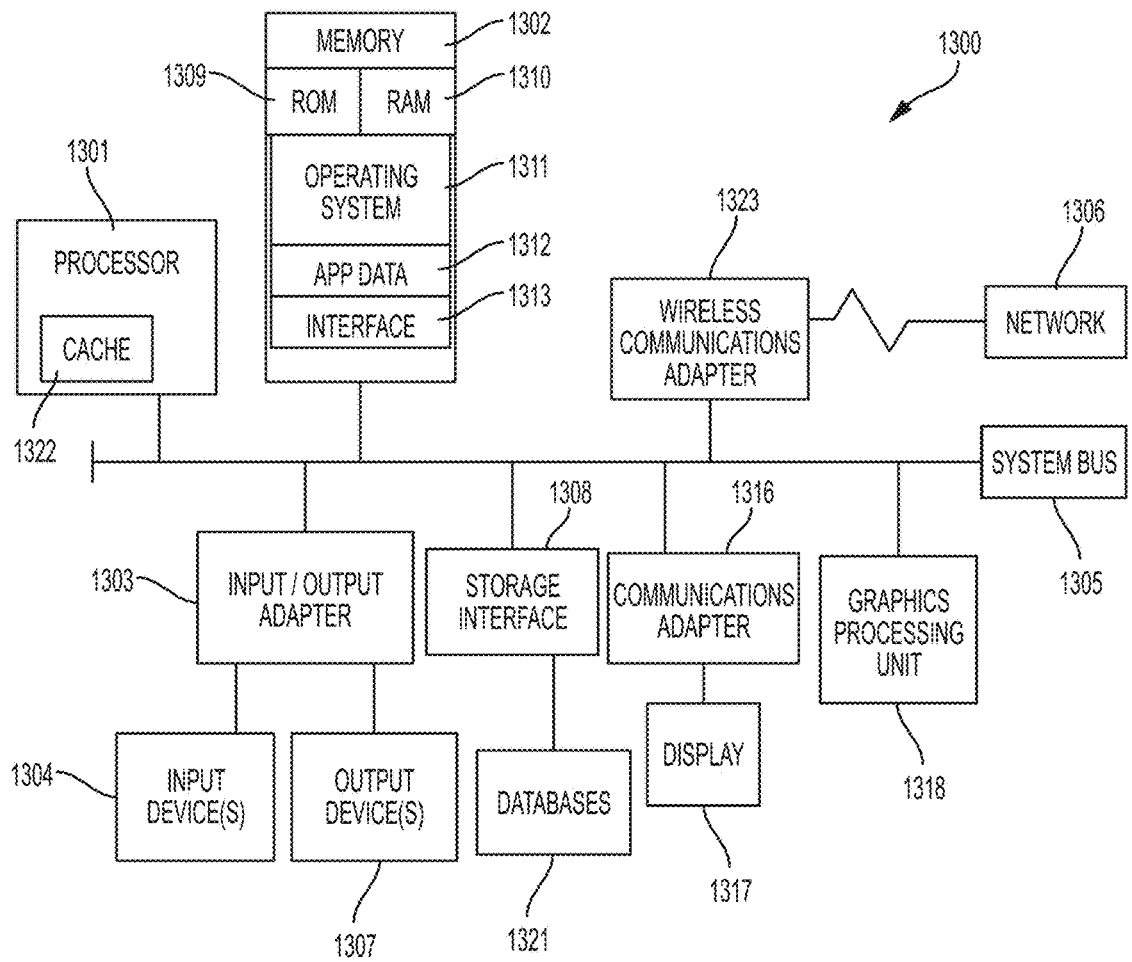
FIG. 13 depicts an exemplary computer system for practicing embodiments described herein.

FIG. 13 illustrates a block diagram of an exemplary computing environment and computer system 1300 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 1300 therefore can embody a general-purpose computer. In another exemplary embodiment, the implementation can be part of a mobile device, such as, for example, a mobile phone, a personal data assistant (PDA), a tablet computer, etc.

As shown in FIG. 13, the computer 1300 includes processor 1301. Computer 1300 also includes memory 1302 communicatively coupled to processor 1301, and one or more input/output adapters 1303 that can be communicatively coupled via system bus 1305. Memory 1302 can be communicatively coupled to one or more internal or external memory devices via a storage interface 1308. Communications adapter 1316 can communicatively connect computer 1300 to one or more networks 1306. System bus 1305 can communicatively connect one or more user interfaces via input/output (I/O) adapter 1303. I/O adapter 1303 can connect a plurality of input devices 1304 to computer 1300. Input devices can include, for example, a keyboard, a mouse, a microphone, a sensor, etc. System bus 1305 can also communicatively connect one or more output devices 1307 via I/O adapter 1303. Output device 1307 can include, for example, a display, a speaker, a touchscreen, etc.

Processor 1301 is a hardware device for executing program instructions (aka software), stored in a computer-readable memory (e.g., memory 1302). Processor 1301 can be any custom made or commercially available processor, a central processing unit (CPU), a plurality of CPUs, an auxiliary processor among several other processors associated with the computer 1300, a semiconductor based microprocessor (in the form of a microchip or chip set), or generally any device for executing instructions. Processor 1301 can include a cache memory 1322, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 1322 can be organized as a hierarchy of more cache levels (L1, L2, etc.).

Processor 1301 can be disposed in communication with one or more memory devices (e.g., RAM 1310 ROM 1309 one or more external databases 1321, etc.) via a storage interface 1308. Storage interface 1308 can also connect to one or more memory devices including, without limitation, one or more databases 1321, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc.

Memory 1302 can include random access memory (RAM) 1310 and read only memory (ROM) 1309. RAM 1310 can be any one or combination of volatile memory elements (e.g., DRAM, SRAM, SDRAM, etc.). ROM 1309 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1302 can incorporate electronic, magnetic, optical, and/or other types of non-transitory computer-readable storage media. Memory 1302 can also be a distributed architecture, where various components are situated remote from one another, but can be accessed by processor 1301.

The instructions in memory 1302 can include one or more separate programs, each of which can include an ordered listing of computer-executable instructions for implementing logical functions. In the example of FIG. 13, the instructions in memory 1302 can include an operating system 1311. Operating system 1311 can control the execution of other computer programs and provides scheduling, input-output control, file and data management, memory management, and communication control and related services.

The program instructions stored in memory 1302 can further include application data 1312, and for a user interface 1313.

I/O adapter 1303 can be, for example but not limited to, one or more buses or other wired or wireless connections. I/O adapter 1303 can have additional elements (which are omitted for simplicity) such as controllers, microprocessors, buffers (caches), drivers, repeaters, and receivers, which can work in concert to enable communications. Further, I/O adapter 1303 can facilitate address, control, and/or data connections to enable appropriate communications among the aforementioned components.

I/O adapter 1303 can further include a display adapter coupled to one or more displays. I/O adapter 1303 can be configured to operatively connect one or more input/output (I/O) devices 1304, 1307 to computer 1300. For example, I/O adapter 1303 can connect a keyboard and mouse, a touchscreen, a speaker, a haptic output device, or other output device. Output devices 1307 can include but are not limited to a printer, a scanner, and/or the like. Other output devices can also be included, although not shown. Finally, the I/O devices connectable to I/O adapter 1303 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 1300 can include a wireless communications adapter 1323. Wireless communications adapter 1323 can include GPS, cellular, mobile, and/or other communications protocols for wireless communication.

In some embodiments, computer 1300 can further include communications adapter 1316 for coupling to a network 1306.

Network 1306 can be an IP-based network for communication between computer 1300 and any external device. Network 1306 transmits and receives data between computer 1300 and devices and/or systems external to computer 1300. In an exemplary embodiment, network 1306 can be a managed IP network administered by a service provider. Network 1306 can be a network internal to an aircraft, such as, for example, an avionics network, etc. Network 1306 can be implemented in a wireless fashion, e.g., using wireless protocols and technologies, such as WiFi, WiMax, etc. Network 1306 can also be a wired network, e.g., an Ethernet network, an ARINC 429 network, a controller area network (CAN), etc., having any wired connectivity including, e.g., an RS232 connection, RS422 connection, etc. Network 1306 can also be a packet-switched network such as a local area network, wide area network, metropolitan area network, Internet network, or other similar type of network environment. The network 1306 can be a fixed wireless network, a wireless local area network (LAN), a wireless wide area network (WAN) a personal area network (PAN), a virtual private network (VPN), intranet or other suitable network system.

Network 1306 can operatively connect computer 1300 to one or more devices including device 1317, device 1318, and device 1320. Network 1306 can also connect computer 1300 to one or more servers.

If computer 1300 is a PC, workstation, laptop, tablet computer and/or the like, the instructions in the memory 1302 can further include a basic input output system (BIOS) (omitted for simplicity). The BIOS is a set of routines that initialize and test hardware at startup, start operating system 1311, and support the transfer of data among the operatively connected hardware devices. The BIOS is typically stored in ROM 1309 so that the BIOS can be executed when computer 1300 is activated. When computer 1300 is in operation, processor 1301 can be configured to execute instructions stored within the memory 1302, to communicate data to and from the memory 1302, and to generally control operations of the computer 1300 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The term "about" is intended to include the degree of error associated with measurement of the particular quantity based upon the equipment available at the time of filing the application. For example, "about" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for monitoring and maintaining aircraft cargos comprising:
    a plurality of master control panels each operatively connected with at least one Line Replaceable Unit (LRU) operating in a cargo compartment of an aircraft and at least one unit load device (ULD), the at least one ULD and at least one LRU configured to move a cargo unit in the cargo compartment based on a control signal from the master control panel;
    a command unit operatively connected with each master control panel of the plurality of master control panels, the command unit comprising a processor configured to:
    retrieve, via the processor, a status of the cargo from each of the plurality of master control panels; and
    display, on an output device, a status of the at least one ULD of a plurality of ULDs and a status of the at least one LRU via the processor, and display one or more recommended actions and one or more test results via a pop-up user dialog box responsive to a diagnostic test wherein the display simultaneously provides a compartment view and a detailed view for an area of interest indicated by a sliding marker window of the compartment view.

2. The system of claim 1, wherein each master control panel is in a different cargo compartment of an aircraft cargo hold.

3. The system of claim 1, wherein the status comprises a fault status of the at least one LRU indicative of a fault encountered by the at least one LRU during a cargo moving procedure.

4. The system of claim 1, wherein the command unit is configured to:

identify a faulty LRU; and perform a diagnostic test on the faulty LRU, the diagnostic test configured to indicate a source of the fault encountered by the LRU.

5. The system of claim 4, wherein identifying a faulty LRU comprises:

receiving, via the processor, an input from a user to perform a diagnostic test;

transmit, via the processor, a status packet request to one or more of the ULDs and one or more of the master control panels;

receive, via the processor, a status packet from one or more of the master control panels; and display, on the output device, an output indicative of the source of the fault encountered by the LRU.

6. The system of claim 1, wherein displaying the status of the plurality of ULDs and the status of the at least one LRUs comprises:

retrieving a position of an ULD of the plurality of ULDs; and outputting a visual representation of a position of the ULD on a representation of a cargo hold, wherein the visual representation of the position of the ULD is geometrically centered on a display screen of the output device and updates in position in real time.

7. A method for monitoring and maintaining aircraft cargos comprising:

connecting a plurality of master control panels with at least one Line Replaceable Unit (LRU) operating in a cargo compartment of an aircraft and at least one unit load device (ULD), the at least one ULD and at least one LRU configured to move a cargo unit in the cargo compartment based on a control signal from the master control panel;

connecting a command unit operatively with each master control panel of the plurality of master control panels, the command unit comprising a processor configured for:

retrieving, via a processor, a status of the cargo from each of the plurality of master control panels; and displaying, on an output device, a status of the at least one ULDs and a status of the at least one LRUs via the processor, and displaying one or more recommended actions and one or more test results via a pop-up user dialog box responsive to a diagnostic test, wherein the display simultaneously provides a compartment view and a detailed view for an area of interest indicated by a sliding marker window of the compartment view.

8. The method of claim 7, wherein each master control panel is in a different cargo compartment of an aircraft cargo hold.

9. The method of claim 7, wherein the status comprises a fault status of the at least one LRU indicative of a fault encountered by the at least one LRU during a cargo moving procedure.

10. The method of claim 7, wherein displaying the status of the at least one ULD comprises displaying a block representation of the at least one ULD.

11. The method of claim 7, wherein displaying the status of the at least one ULD comprises displaying a marker window indicative of a region of interest.

12. The method of claim 7, wherein the command unit comprises a processor configured for:

identifying a faulty LRU; and performing a diagnostic test on the faulty LRU, the diagnostic test configured to indicate a source of the fault encountered by the at least one LRU.

13. The method of claim 12, wherein identifying a faulty LRU comprises:

receiving, via the processor, an input from a user to perform a diagnostic test;

transmitting, via the processor, a status packet request to one or more of the ULDs and one or more of the master control panels;

receiving, via the processor, a status packet from one or more of the master control panels; and displaying, on the output device, an output indicative of the source of the fault encountered by the at least one LRU.

14. The method of claim 13, wherein displaying the output indicative of the source of the fault comprises outputting a focused view of the faulty LRU directly by receiving user input of a selection of the faulty LRU without engaging a cargo compartment display.

15. The method of claim 7, wherein displaying the status of the plurality of ULDs and the status of the at least one LRU comprises:

retrieving a position of an ULD of the plurality of ULDs; and outputting a visual representation of a position of the ULD on a representation of the cargo hold, wherein the visual representation of the position of the ULD is geometrically centered on a display screen of the output device and updates in position in real time.

16. The method of claim 15, wherein outputting the visual representation of the position of the ULD comprises outputting multiple views including a compartment representation view and a detailed view of a portion of the cargo compartment.

17. The method of claim 16, wherein outputting the visual representation of the position of the ULD comprises focusing a view of the position of the ULD at a center of the display screen and moving a background of the detailed view relative to movement of the ULD.

18. The method of claim 16, wherein outputting the visual representation of the position of the ULD comprises:

outputting a list of one or more available ULDs in the selection panel; and receiving a selection input indicative of a user selection of a ULD of interest.

19. A computer program product comprising a non-transitory computer readable medium, the computer readable medium comprising program instructions that, when executed by a processor, perform a method for monitoring and maintaining aircraft cargos comprising:

connecting a plurality of master control panels with at least one Line Replaceable Unit (LRU) operating in a cargo compartment of an aircraft and at least one unit load device (ULD), the at least one ULD and at least one LRU configured to move a cargo unit in the cargo compartment based on a control signal from the master control panel;

connecting a command unit operatively with each of the plurality of master control panels, the command unit comprising a processor configured for:

retrieving, via a processor, a status of the cargo from each master control panel of the plurality of master control panels; and displaying, on an output device, a status of the ULDs and a status of the at least one LRU via the processor, and responsive to performing diagnostic tests, displaying one or more recommended actions and one or more test results via a pop-up user dialog box, wherein the output device simultaneously displays a compartment view and a detailed view for an area of interest indicated by a sliding marker window of the compartment view.

* * * * *